(12) United States Patent
Rosendahl

(10) Patent No.: US 6,997,222 B2
(45) Date of Patent: Feb. 14, 2006

(54) ROUTER CONSTRUCTION FOR CLEARING MACHINED MATERIALS

(76) Inventor: Dean Robert Rosendahl, 1044 Charleswood Road, Winnipeg, Manitoba (CA) R3R 3X2

( * ) Notice: Subject to any disclaimer, the term of this patent is extended or adjusted under 35 U.S.C. 154(b) by 72 days.

(21) Appl. No.: 10/628,572

(22) Filed: Jul. 29, 2003

(65) Prior Publication Data

US 2005/0022904 A1 Feb. 3, 2005

(51) Int. Cl.
- *B27C 5/02* (2006.01)
- *B27G 21/00* (2006.01)
- *B25H 1/00* (2006.01)

(52) U.S. Cl. .................. 144/371; 144/252.1; 144/286.5

(58) Field of Classification Search ............ 144/134.1, 144/136.95, 154.5, 252.1, 252.2, 371, 360, 144/368, 171, 136.1, 286.5; 408/67; 409/137, 409/182; 83/100; 451/456
See application file for complete search history.

(56) References Cited

U.S. PATENT DOCUMENTS

| | | | | |
|---|---|---|---|---|
| 4,821,365 A | * | 4/1989 | Charters ...................... 15/339 |
| 5,611,378 A | * | 3/1997 | Brazell ..................... 144/135.2 |
| 5,678,965 A | * | 10/1997 | Strick ......................... 409/132 |
| 6,305,447 B1 | * | 10/2001 | Rousseau ................. 144/135.2 |

FOREIGN PATENT DOCUMENTS

| | | | |
|---|---|---|---|
| SU | 188261 | * | 3/1967 |
| SU | 686832 | * | 10/1979 |

OTHER PUBLICATIONS

Article from Better Homes & Gardens WOOD—pp. 50 to 56.

* cited by examiner

*Primary Examiner*—Derris H. Banks
*Assistant Examiner*—Shelley Self
(74) *Attorney, Agent, or Firm*—Adrian D. Battison; Michael R. Williams; Ryan W. Dupuis

(57) ABSTRACT

A system of machining a workpiece with a router bit includes a plate insert for a router table having a work surface over which the workpiece is to be moved. The router is mounted underneath the plate with the bit driven about a bit axis which is at right angles to the table surface and projecting through a bit opening. At least one and preferably two suction openings through the table from the work surface to an opposed side of the table are connected to a common suction duct with the suction opening or openings being at a location spaced from the bit opening and preferably spaced at right angles from the bit axis. The workpiece is moved or arranged on the table surface so as to define a passage for the waste material from the bit to the suction opening. In one embodiment, the openings are arranged inside the area of the end plate of the router and connected to a duct formed in the end plate. In another embodiment, the openings are outside the end plate and connected to a common suction housing separate from the router.

34 Claims, 10 Drawing Sheets top side of plate end face of router bottom side view of plate and router

ROUTER CONSTRUCTION FOR CLEARING MACHINED MATERIALS

This invention relates to a method and assembly for use in machining workpieces by a router and particularly to an arrangement which allows clearing of machined waste from the area of the router bit.

BACKGROUND OF THE INVENTION

Routers have become a popular tool in woodworking due to the flexibility of the tool allowing it to carry out a number of different functions. This flexibility has been particularly enhanced by providing a router table with an upper surface on which the workpiece can be located and moved so as to move relative to the fixed router and the router bit which projects through the surface.

Routers therefore are commonly used with a router table and in many cases the router table includes an insert plate which is bolted onto the end plate of the router so that the drive shaft of the router projects through an opening in the plate to the router bit which is presented wholly or partly above the surface to act upon the workpiece. Different arrangements of bits can be used for different functions.

In some cases the router is used to cut a groove in the under surface of the workpiece with the groove being shaped in dependence upon the shape of the bit for various different arrangements and uses.

In other functions, the bit is used to cut or shape an edge of the workpiece. In this case the workpiece can be guided by a fence mounted on the table at the bit. Other arrangements of guide fence are well known to one skilled in the art for co-operation with various guide elements which can be attached to the workpiece or to the table.

Routers can also be used as hand held or manual tools where the workpiece is clamped to the table and the router bit moved over the workpiece. The bit axis is maintained at right angles to the workpiece surface by providing a router end plate lying in a radial plane of the bit so that the bottom surface of the end plate can slide over the workpiece in contact with the upper surface thereof.

One problem area which remains in such routers, despite many years of development and availability, is that of removing the machined waste material in the form of dust or chips which can be expelled into the air or left as waste material on the table or on the workpiece.

This problem has been sufficiently severe to limit the desirability of this machining method since the material expelled into the air is difficult to control and can be at best unpleasant and at worst environmentally damaging.

Various attempts have therefore been made to extract the dust and particles from the area of the workpiece including overhead suction nozzles which are attached to a suction duct. Such suction nozzles can be adjusted and located at a suitable position so as to attempt to carry away the dust and particles expelled by the bit in an upward direction away from the table. This arrangement is unsatisfactory in that it is unable to collect all of the materials escaping into the air and in that it often leaves materials on the table which interfere with the operation and movement of the workpiece, or it leaves materials on the workpiece which interfere with the movement of the hand held router.

Another arrangement has been provided to generate suction around the bit at the bit opening in the table. This is normally provided by generating a suction duct in the end plate of the router. Thus the end plate around the motor is machined with various walls and dividers in the end plate it is clamped to the underside of the table so as to generate a suction around the bit opening to attempt to extract material which is released at the bit into the end plate of the router and from that end plate into a suction nozzle attached to the router itself. This arrangement has become widely and commonly accepted in the router industry and many routers are currently available with such a suction extraction system. However the system has been revealed to be less than satisfactory leaving many particles on the table and still allowing dust to expel into the air.

Up until now there has been no simple solution to problem of waste material extraction and this remains and has remained a long standing problem.

SUMMARY OF THE INVENTION

It is one object of the invention to provide an improved method for use with machining a workpiece using a router in which the waste material is cleared away more effectively.

According to one aspect of the invention there is provided a method of machining a workpiece with a router bit comprising:

providing a workpiece;

providing a router having a router motor and a router bit rotated by the router motor;

providing a surface in contact with the workpiece;

causing relative translational movement between the workpiece and the router bit so as to effect a cutting action on the workpiece by the router bit as the bit rotates so as to cause waste material to be removed from the workpiece;

the surface being arranged such that the relative movement between the router bit and the workpiece also causes relative sliding movement between the surface and the workpiece while the surface remains in contact with the workpiece;

providing a suction duct having a suction opening at the surface with the suction duct extending from the surface to a side of the surface away from the workpiece;

providing the suction opening at a location spaced from the bit so that the suction opening is separated from the bit;

connecting a suction duct to a source of suction to draw air and the waste material through the suction opening;

and arranging the workpiece and the surface so as to define a passage for the waste material from the bit to the suction opening.

In one embodiment, the surface forms the work surface of a router table, wherein the router is supported at the table surface such that the router has a router bit driven by a router motor about a bit axis which is at right angles to the table surface and such that the router bit projects through a router bit opening in the table surface and wherein the suction opening extends from the work surface to an opposed side of the table.

In this embodiment, the suction opening can be located in the table surface itself, that is either in the table or in an insert plate forming part of the table, or the suction opening can be located in an extension piece mounted at one edge of the table surface.

The table preferably includes a base table portion with a plate which forms an insert into the table and carries or is attached to the router and to the suction. However this construction is not essential and the system and arrangement described herein can be used as a whole table without the separate insert portion.

In accordance with a preferred method there is provided a second suction opening through the table from the work surface to an opposed side of the table, the second suction opening being at a location spaced from the bit opening and from the first suction opening.

In this arrangement, the second suction opening can be arranged substantially on a line from the axis of bit which line is at right angles to a line joining the first suction opening and the axis of the bit.

The second opening can be used particularly in a method including mounting a guide fence on the table which has an opening at the bit wherein the first suction opening is located along the fence from the bit and the second suction opening is located behind the fence at a position generally at right angles to the fence. This location of the two openings defines a first passage along the edge of the workpiece to the first opening and a second passage behind the fence from the bit to collect material passing through the opening in the fence at the bit.

In an alternative use of the two openings, the workpiece is moved such that the passage is moved from the first suction opening to the second suction opening. The passage is thus formed generally along the cut line of the bit on the workpiece and in some cases it is desirable to select one or other of the openings depending upon the direction of the cutting action which can be varied to form curved or angled cut lines.

In one arrangement in which the table and router are not designed for interconnection and co-operation but the table is designed for use with a generic or conventional router, where the router motor has an end plate clamped to the opposite side of the table, the suction opening is located in a position on the table which is outside of the area of the end plate of the router and there is provided a suction head connected to the table for connection of said suction duct to the suction opening.

In another arrangement in which the table and router are designed for interconnection and co-operation, where the router motor has an end plate clamped to the opposite side of the table, the suction opening is located in a position on the table which is inside of the area of the end plate of the router and there is provided a duct formed in the end plate of the router which connects to the suction duct and to the suction opening. In this arrangement, the duct formed in the end plate of the router is separated from the bit opening.

The term "end plate" of the router as used herein is not intended to imply or state any particular construction or shape of the member so defined and is merely intended to relate to that end member which defines an end plate of the router for attachment to the table or for sliding over the workpiece.

Also in this arrangement, there can be provided a second suction opening through the table from the work surface to an opposed side of the table, the second suction opening being at a location spaced from the bit opening and from the first suction opening, the first and second suction openings being connected to the same duct formed in the end plate.

As an alternative to the table mounted router system described above, the same method can be used with a hand held router in which the workpiece is clamped to the table and the router is moved by a suitable support or by hand over the workpiece. In this method, wherein the router motor has an end plate with an end plate at the router bit and lying in a radial plane of the axis of rotation of the bit, the end plate defining said surface in contact with the workpiece, the suction opening is located in the end plate and wherein there is provided a duct formed in the end plate of the router which connects to the suction source and to the suction opening.

In this embodiment of the method, the end plate preferably includes a portion thereof containing said suction opening which can rotate around the axis relative to the router motor so as to move the angular location of the suction opening around the axis relative to the router motor.

The portion is preferably but not necessarily annular and surrounds a fixed inner portion of the end plate.

The portion preferably includes raised guide members on the bottom surface thereof for sliding of the portion relative to the workpiece.

In this embodiment, rotation of the portion around the axis is guided by some suitable technique, which can be manual or automatic, so as to locate the suction opening on a line along the direction of movement of the router bit relative to the workpiece so that the suction opening is located behind the bit. In a manual guiding system, a suitable connection can be provided between the handles and the rotatable portion so that the user can guide the rotation of the portion while holding the handles to support and move the router in the cutting action.

Where the guiding is done automatically this can be achieved in one convenient arrangement by providing engagement members on the surface thereof arranged to cause rotation of the portion by friction with the workpiece.

Preferably rotation of the portion is guided by providing elongate guide ribs on the surface thereof arranged longitudinal of a line joining the suction opening to the router bit.

According to a second aspect of the invention there is provided a combination of a router and a router table member comprising:

a router table member having a work surface over which a workpiece is to be moved;

a router connected at the table surface such that the router has a router bit driven by a router motor about a bit axis which is at right angles to the table surface;

a router bit opening through the table surface at the router bit;

a suction opening at the work surface of the table member extending from the work surface to a side of the table member opposite the work surface of the table, the suction opening being at a location spaced from the bit opening;

and a suction duct for connection to the suction opening on the opposed side of the table member so as to draw air and waste material through the suction opening to the suction duct.

The table member can be formed by a whole table or as a table insert to be mounted in a suitable opening in an existing table.

According to a third aspect of the invention there is provided a router comprising:

a router body having an end plate;

a router motor mounted in the router body;

a router bit driven by the router motor about a bit axis which is at right angles to an end surface of the end plate and arranged such that the router bit can project through a bit opening through the end plate;

and a suction duct in the end plate of the router body for connection to a suction opening end face so as to draw air and waste material through the suction opening to the suction duct wherein the duct formed in the end plate of the router is arranged such that the duct is separated from the bit opening.

According to a fourth aspect of the invention there is provided a router table insert plate comprising:

a plate having a work surface over which a workpiece is to be moved;

holes in the plate arranged for connection to an end plate of a router having a router bit driven by a router motor about a bit axis which is at right angles to the table surface;

a router bit opening through the plate arranged so as to be located at the router bit;

and a suction opening through the plate from the work surface to an opposed side of the table, the suction opening being at a location spaced from the bit opening, and being arranged for connection to a suction duct on the opposed side.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
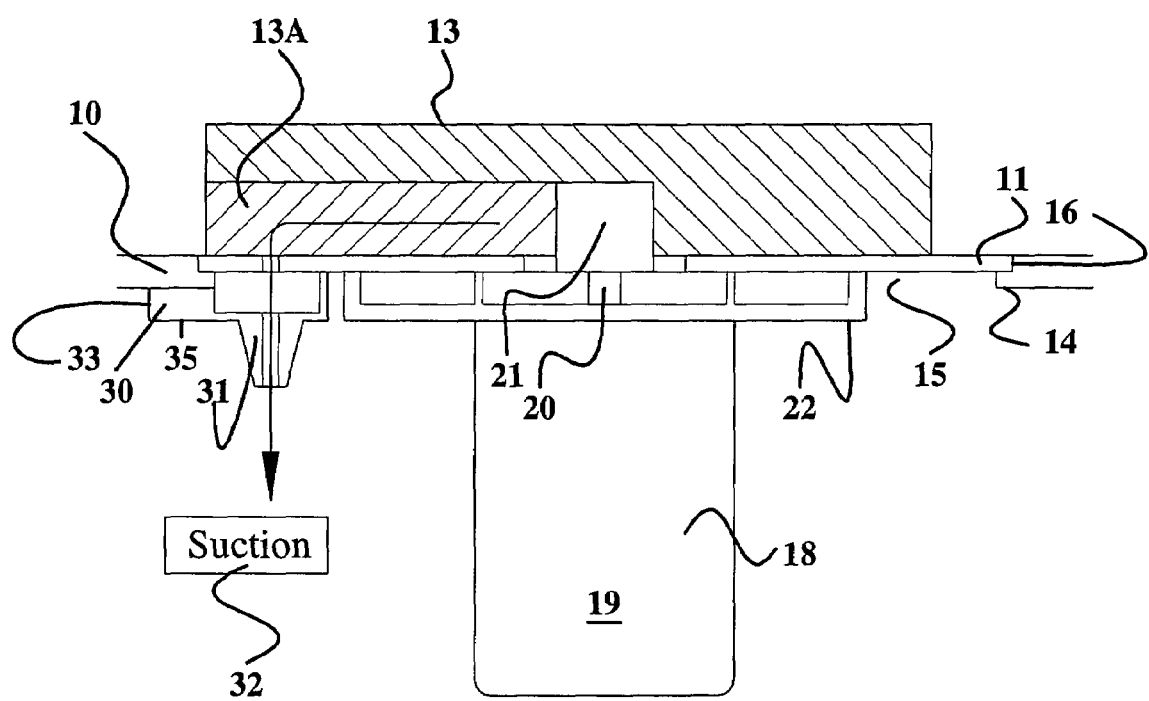
FIG. 1 is a transverse cross-sectional view through a first embodiment of a combination of router table and router mounted thereon in which the suction cleaning according to the present invention is separate from the router itself.
Figure 2:
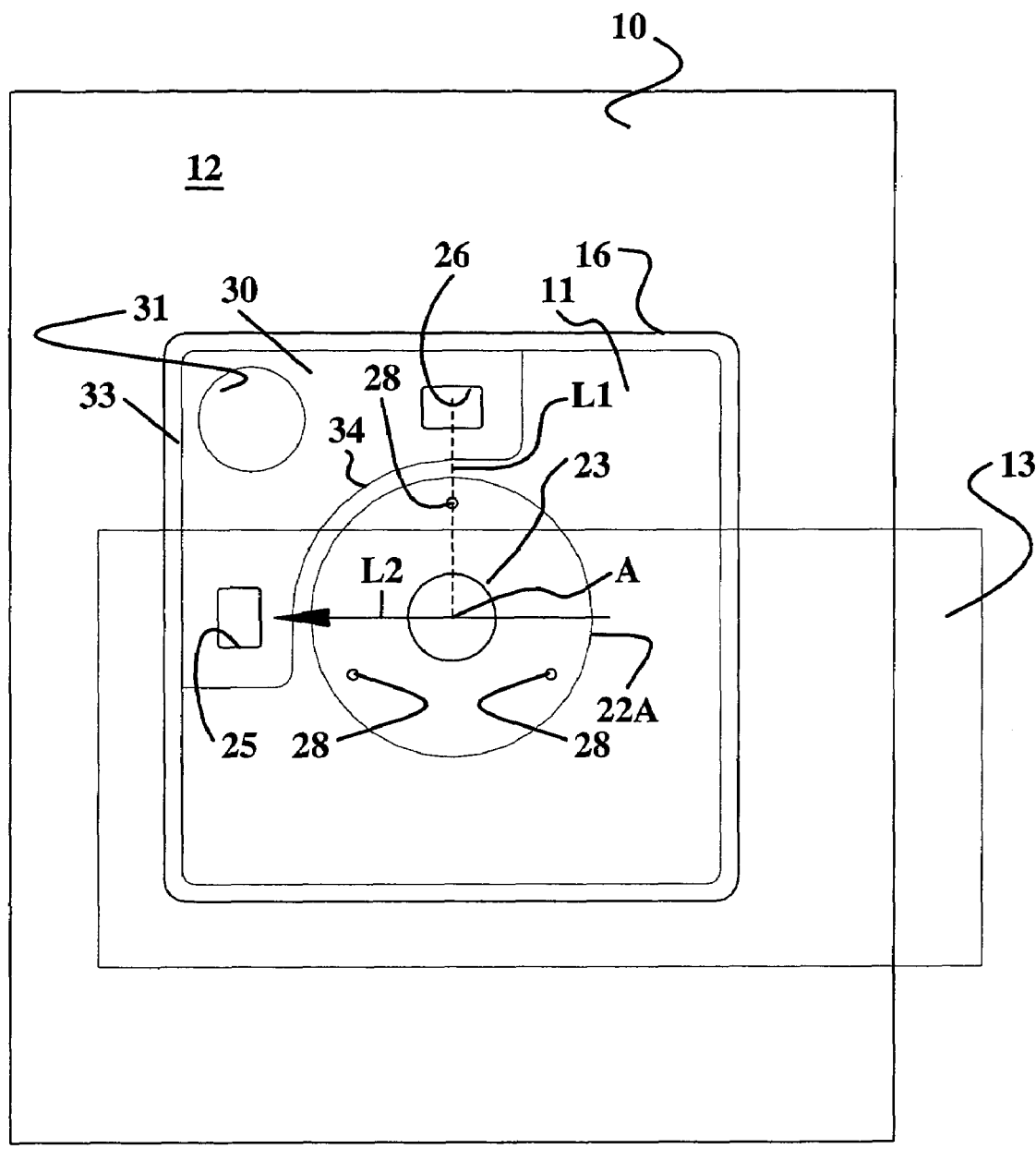
FIG. 2 is a top plan view of the embodiment of FIG. 1.

In the arrangement shown in FIGS. 1 and 2 is provided a router table having an insert plate 11 so that the table 10 and insert plate 11 define a horizontal upper surface 12 which can receive a workpiece 13. The table is mounted on suitable supports (not shown) and includes suitable clamping arrangements (also not shown) which are well known to one skilled in the art.

The table 10 defines a lip 14 surrounding a rectangular opening 15 over which the plate 11 is mounted so that an edge 16 of the plate sits on the lip 14 allowing the plate to be dropped in place within the opening 15 to provide the upper surface 12 as a flush smooth surface for receiving the workpiece.

A router 18 includes a router motor 19 with a drive shaft 20 and a bit 21. The motor 19 is attached to an end face plate 22 which is bolted to the underside of the plate 11 by fasteners suitably designed to hold the face plate 22 fixed to the underside of the plate 11. The fasteners are not shown for convenience of illustration but will be well known to one skilled in the art and can be arranged at suitable positions around the periphery of the face plate 22 as is well known.

In FIG. 2, the area of the end plate 22 is indicated at the line 22A on the underside of the plate 11. The bit opening in the plate is indicated at 23.

The suction clearing system for clearing waste material in the machining action in the embodiment shown in FIGS. 1 and 2 comprises a pair of suction openings 25 and 26 which extend through the plate in the area of the plate within the periphery 16 of the plate and outside the area 22A of the router. As shown the openings are rectangular but their shape can vary. The openings are located as close as possible to the periphery 22A without interfering with the end face of the router. It will be appreciated that such plates are generally designed to accommodate different sizes and construction of router for different designs of router by different manufacturers and therefore the area 22A may vary for different routers. The location of the openings 25 and 26 is therefore positioned so that it is necessarily outside the largest known or available router construction for which the plate is designed. The plate therefore has mounting openings schematically indicated at 28 which are shaped and designed to accommodate different arrangements of routers.

The openings 25 and 26 are arranged so as to lie on lines L1 and L2 which are at right angles relative to the axis A of the bit. Thus one of the openings 25 is arranged across the table along the line L2 relative to the bit and the other is arranged along the table relative to the length of the table along line L1.

Underneath the plate is mounted a suction housing 30 which connects to an outlet nozzle 31 connected to a source of suction indicated at 32. The housing includes an outer wall 33 at the edge of the plate and a curved wall 34 extending around the area 22A. A bottom plate 35 closes the housing apart from the outlet 31. Thus the suction connected to the outlet nozzle 31 is applied through the housing to both of the openings 25 and 26.

Figure 4:
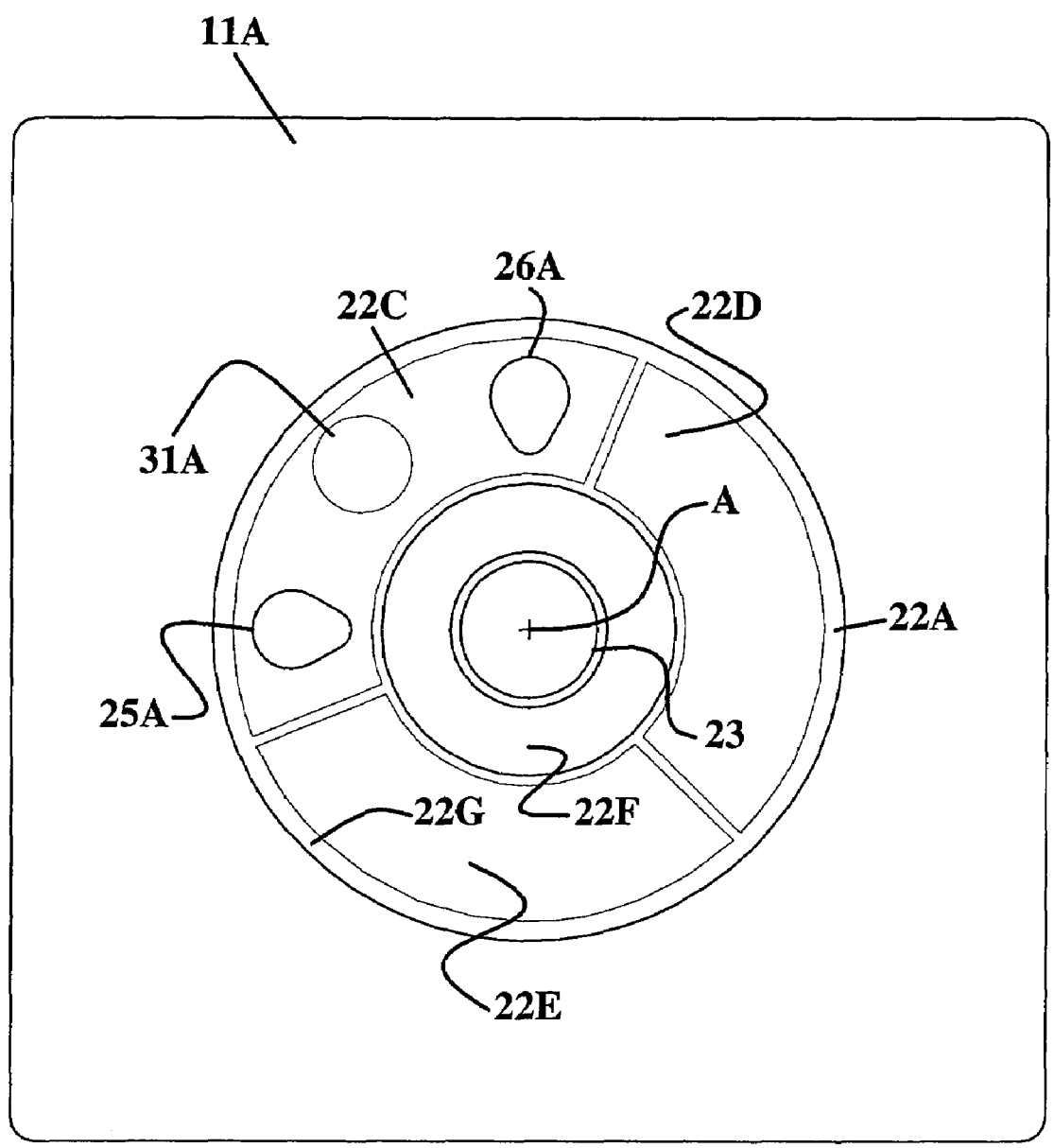
FIG. 4 is a top plan view of a second embodiment of table and router where the suction passes through the end plate of a specially designed router for use with the table.
Figure 5:
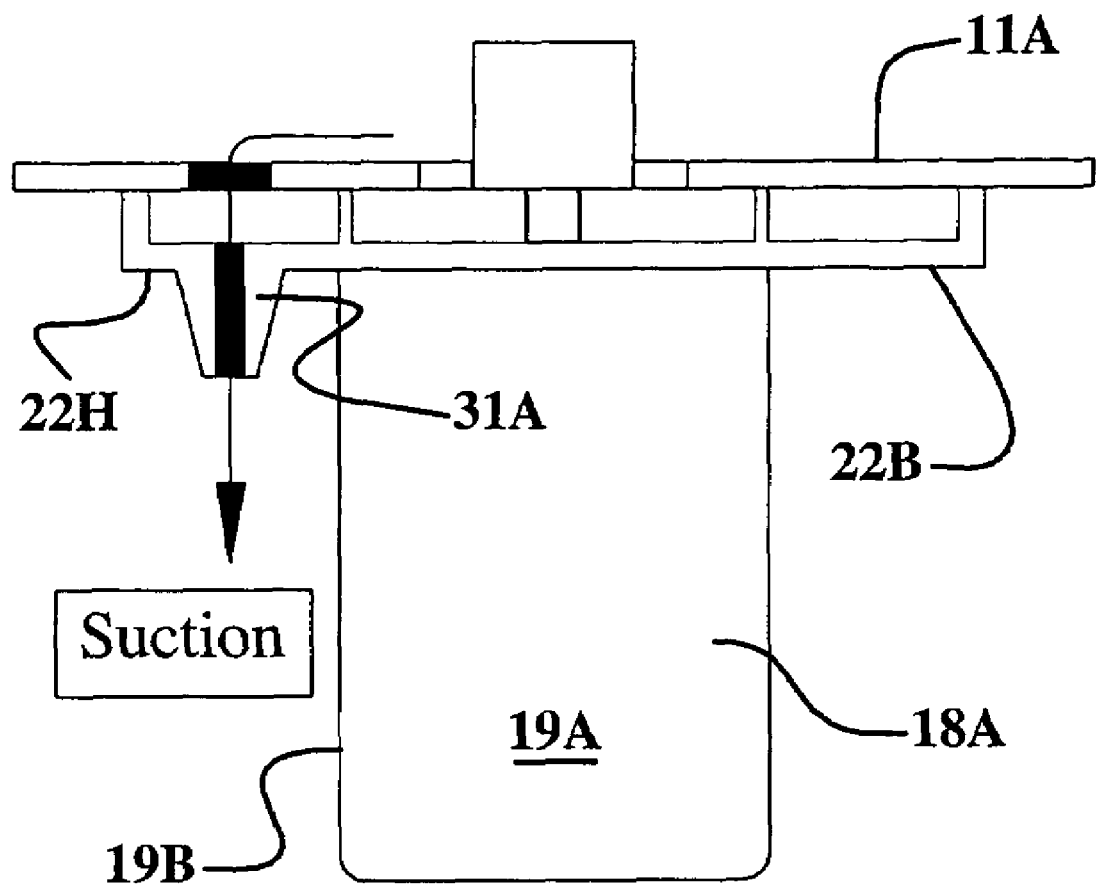
FIG. 5 is a transverse cross-sectional view of the embodiment of FIG. 4.
Figure 6:
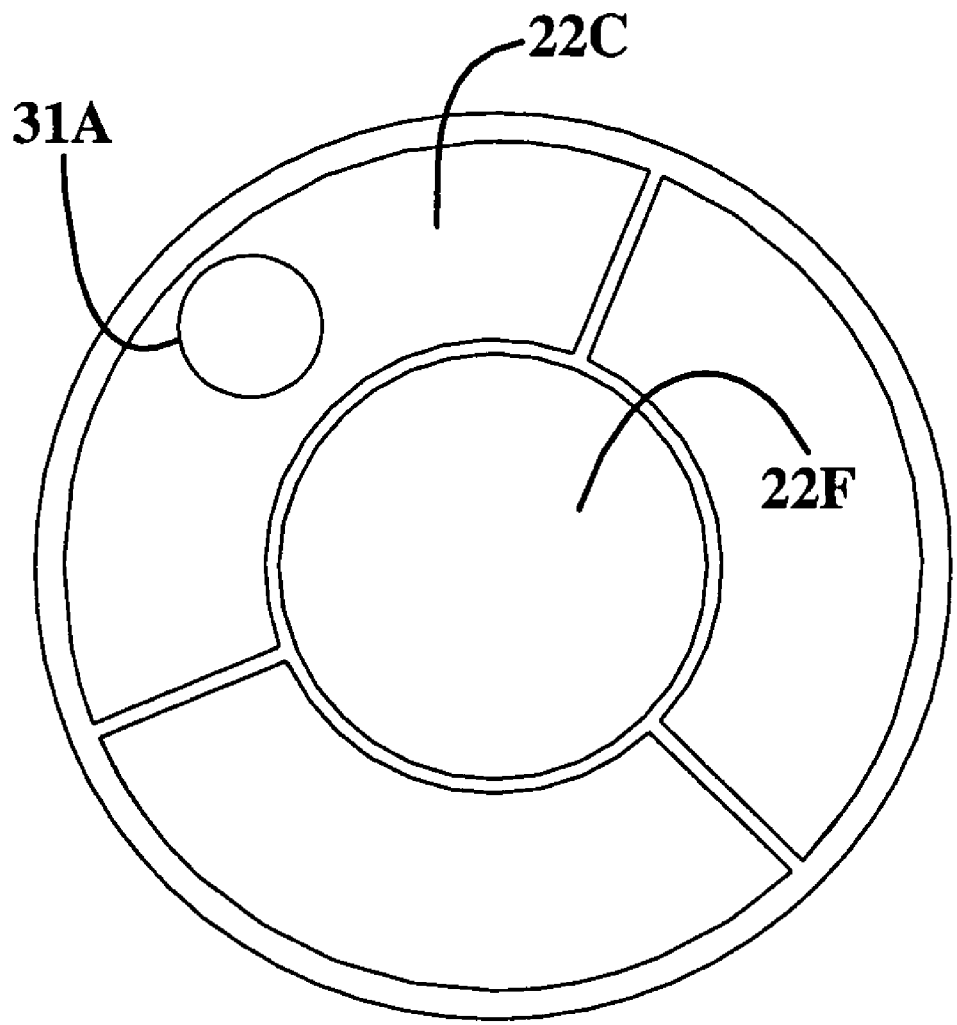
FIG. 6 is a end view of the router only of the embodiment of FIG. 4.

In a second embodiment shown in FIGS. 4, 5 and 6 an insert plate 11A is provided for mounting in a table as previously described. The plate 11A is attached to a router 18A including a motor 19A and an end mounting plate 22B attached to the underside of the plate 11A. From this embodiment two openings 25A and 26A are provided through the plate but these are located within the area 22A of the periphery of the end plate of the router. In this embodiment the end plate of the router is formed with receptacles 22C, 22D, 22E and 22F in its underface defined by walls 22G. The walls thus separate the compartment 22C from the compartment 22F which contains the bit opening 23. In this embodiment the end plate 22B projects beyond the sides 19B of the motor so as to provide an end plate 22H shaped as an annulus surrounding the motor 19A. A suction nozzle 31A is connected to the end plate 22H for applying suction to the area underneath the end plate 22B that is between the underside of the plate 11A and within the end plate 22B. This suction nozzle 31A is connected to the compartment 22C only so that the suction is applied to the openings 25A and 26A through the plate 11A and is not applied to the area of the bit opening 23.

Again the openings 25A and 26A are located on lines relative to the bit axis A which are at right angles and extend transversely of the table and longitudinally of the table respectively.

In operation as shown in FIG. 1, the work piece indicated at 13 is moved across the router bit 21 so as to form a slot 13A in the workpiece. The user guides the workpiece relative to the bit 21 using known guides or manual operation and at the same time locates the slot 13A defined in the workpiece so that it is positioned over one or other of the openings 25 and 26. This defines a passage extending from the bit to the suction extraction duct 31 so that air is drawn vigorously from the area of the bit through the passage or slot 13A to the suction nozzle thus forming an air stream which carries the material from the bit directly away from the bit to suction. The material cut by the bit tends to be thrown by centrifugal force away from the bit so that the centrifugal force acts to send the material into the passage 13A which assists in the movement towards the remote extraction opening 25 or 26 which is spaced away from the bit rather than located at the bit. The material thus is inhibited from or prevented from escaping into the atmosphere and is also prevented from or inhibited from collecting on the table around the workpiece.

The same operation as shown in FIG. 1 can operate either with the remote suction opening 25 or the opening 25A within the housing of the router.

Figure 3:
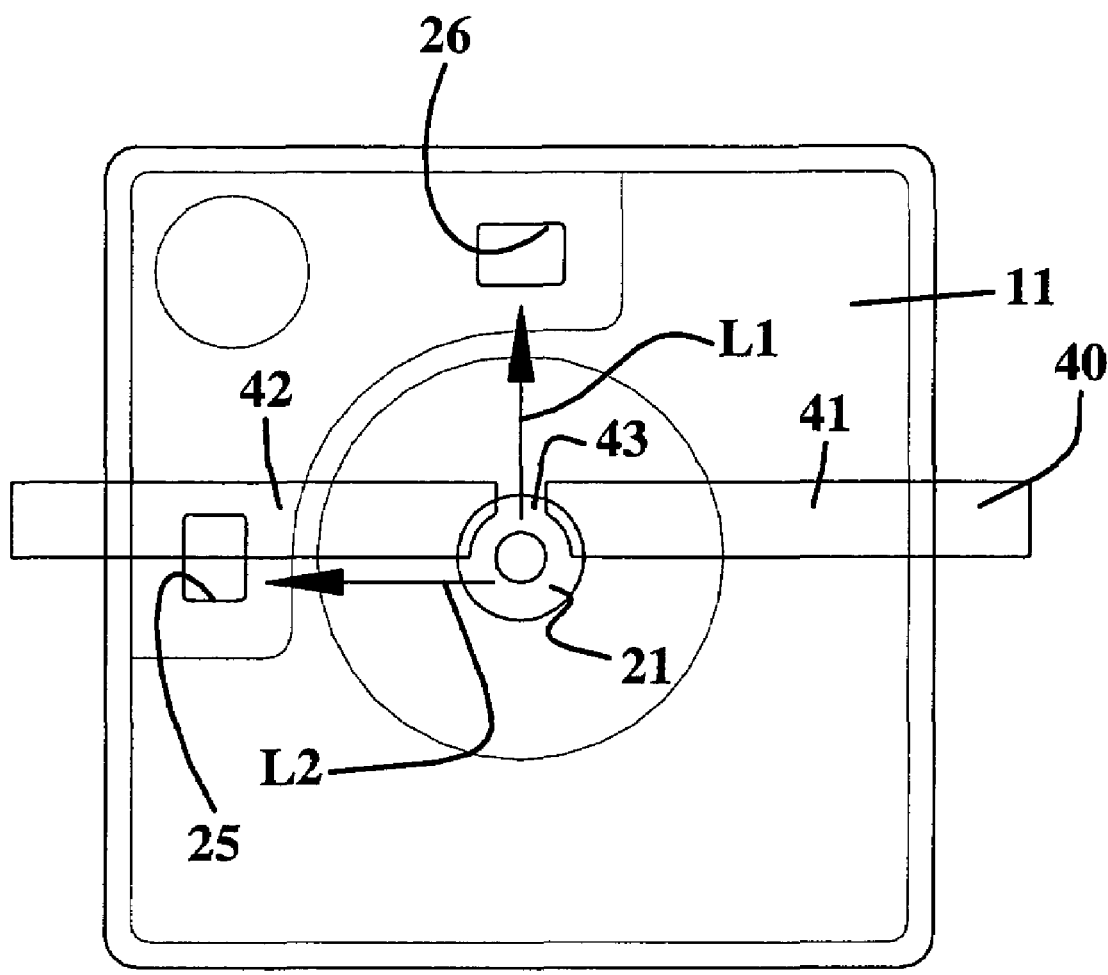
FIG. 3 is a top plan view of the embodiment of FIG. 1 showing the table used with a workpiece guide fence.

In the arrangement shown in FIG. 3, the plate 11 is used in conjunction with a guide fence 40 which is located at the bit 21 and has a space at the bit formed by two sections 41 and 42 of the fence which are separated at an opening 43 at the bit. The opening at the bit is necessary so that the bit can operate on the workpiece on one side of the fence 40.

The fence is aligned with the opening 25 and therefore at right angles to the opening 26 which is spaced behind the fence relative to the bit along the line L2 though the opening 43. Therefore in operation with the workpiece moving along the guide fence 40, a passage is defined along the line L1 from the bit between the fence and the workpiece to the opening 25. A second passage is defined through the opening 43 across the plate 11 to the opening 26.

Figure 7:
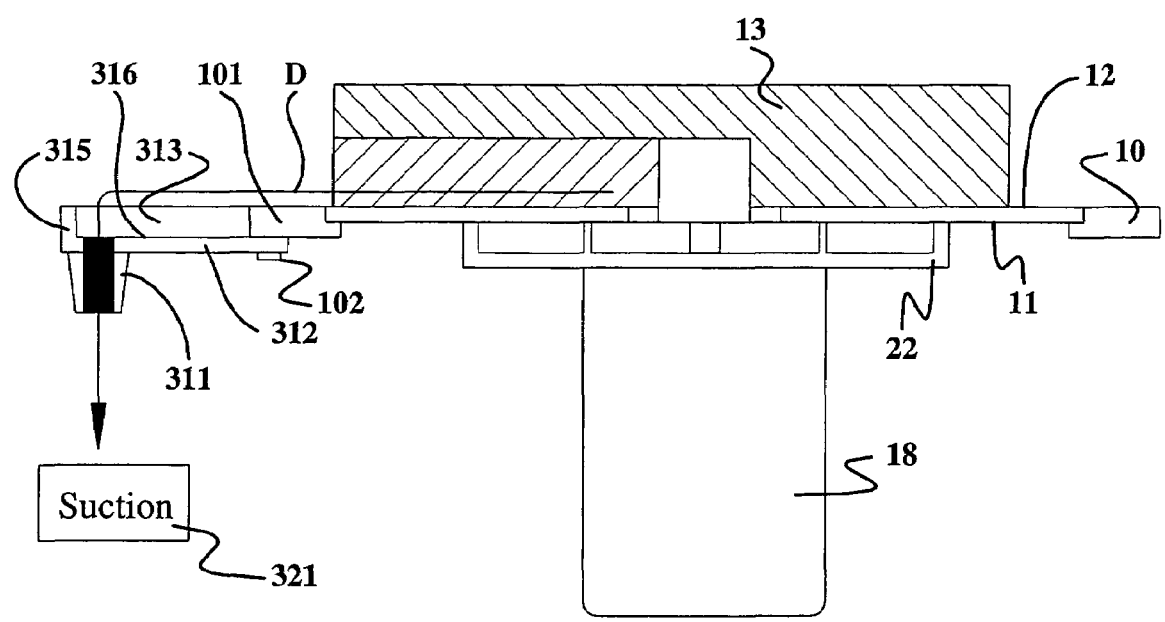
FIG. 7 is a transverse cross-sectional view through a third embodiment of a combination of router table and router mounted thereon in which the suction cleaning according to the present invention is mounted on the table as an attachment thereto.
Figure 8:
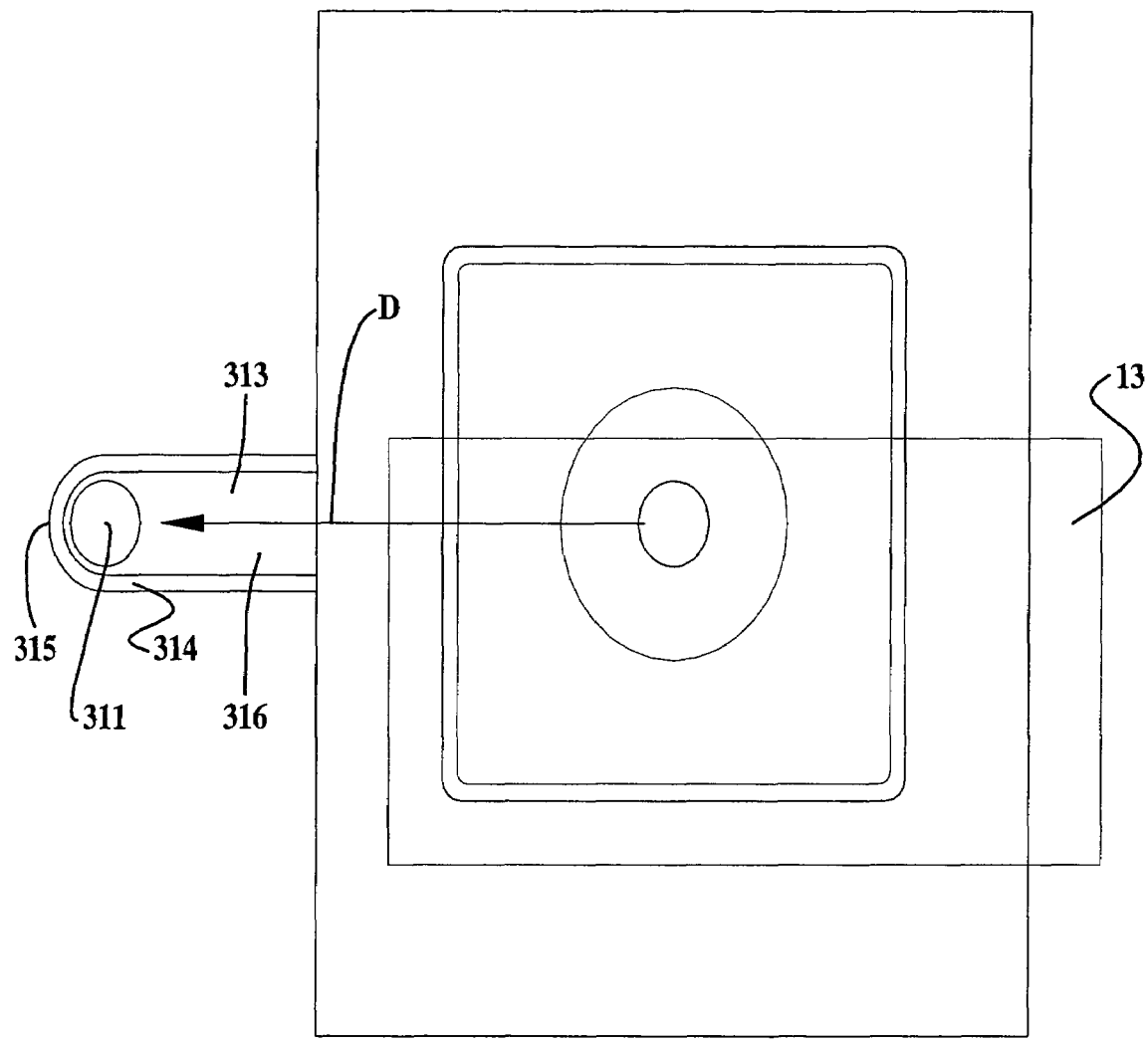
FIG. 8 is a top plan view of the embodiment of FIG. 7.

In FIGS. 7 and 8 is shown a third embodiment which is similar to that of FIG. 1 in that the suction opening is part of the table rather than part of the router itself. Thus the embodiment comprises a table 10 as previously described with an insert plate 11 defining an upper surface 12 for receiving the work piece 13. The router 18 includes the end plate 22 fastened to the plate 11 as previously described. In this embodiment, however, the suction duct 311 connected to a suction source 321 is formed as part of an attachment piece 312 which is clamped onto the edge 101 of the table by a clamping system 102. The attachment piece 312 defines a channel 313 with side walls 314 and an end wall 315. The channel includes a bottom wall 316 which is spaced downwardly from the top surface of the table 10 with the top surfaces of the walls 314 and 315 coplanar with the surface of the table. The duct 311 is attached into the bottom wall 316 at a position spaced outwardly from the table and at the outer end of the channel 312. The arrangement of FIGS. 7 and 8 operates in the same manner as previously described in that the channel, the workpiece and the table surface define a passage for airflow along the direction D from the waste material at the bit across the table surface, through the channel and into the section duct 311. Thus the suction duct is arranged to be located at a position sufficiently close to the action of the workpiece so that the airflow from the workpiece through the passage defined by the workpiece and the table surface can draw the waste material away from the bit to provide a cleaning action. The channel 312 is therefore relatively short. However it will be appreciated that the suction duct can therefore be provided on the table surface, that is through the actual body of the table surface or can be located at the edge of the table surface while providing substantially the same effect.

Figure 9:
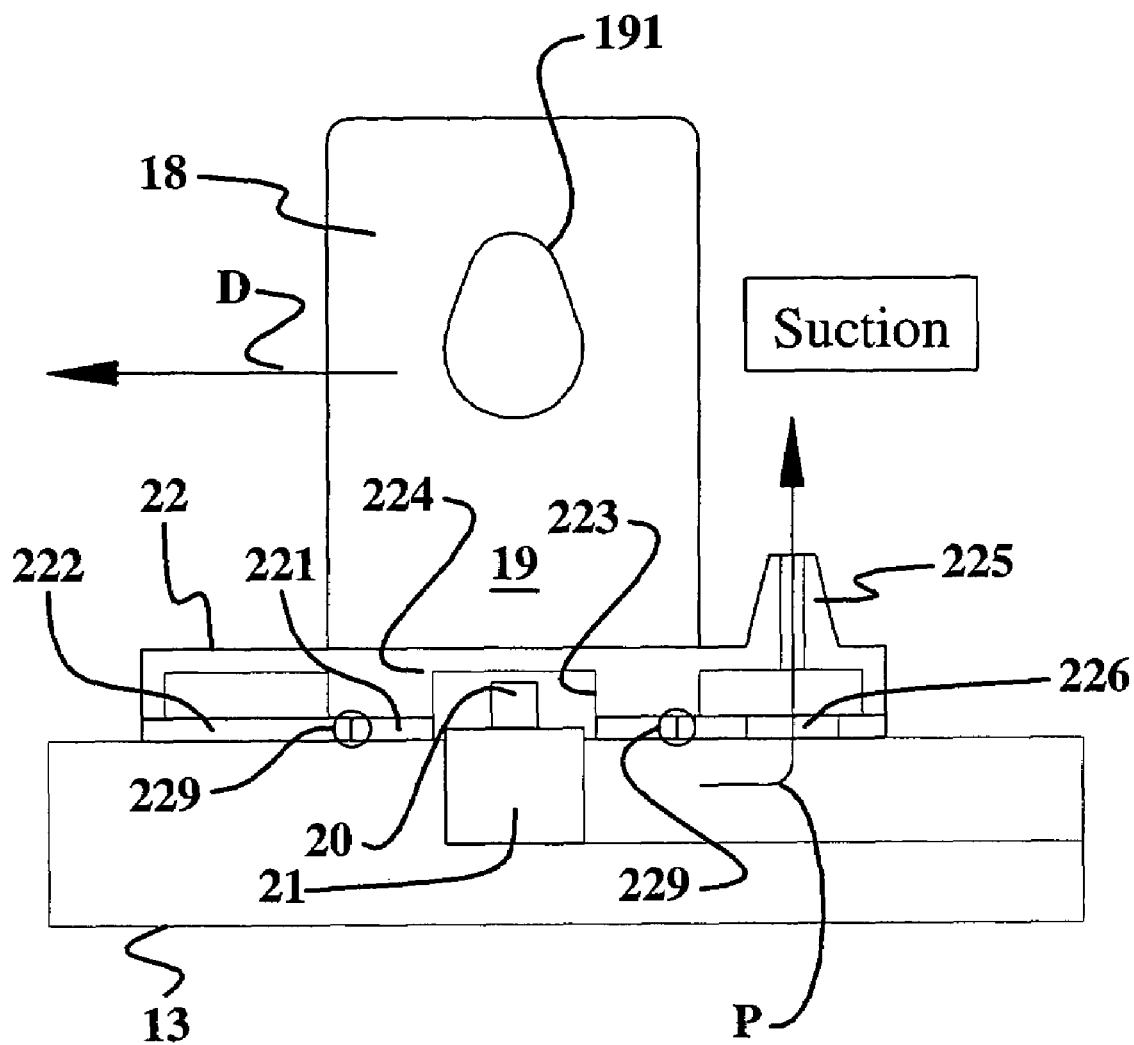
FIG. 9 is a transverse cross-sectional view through a fourth embodiment of a router in which the suction cleaning according to the present invention is provided on a surface of the router itself.
Figure 10:
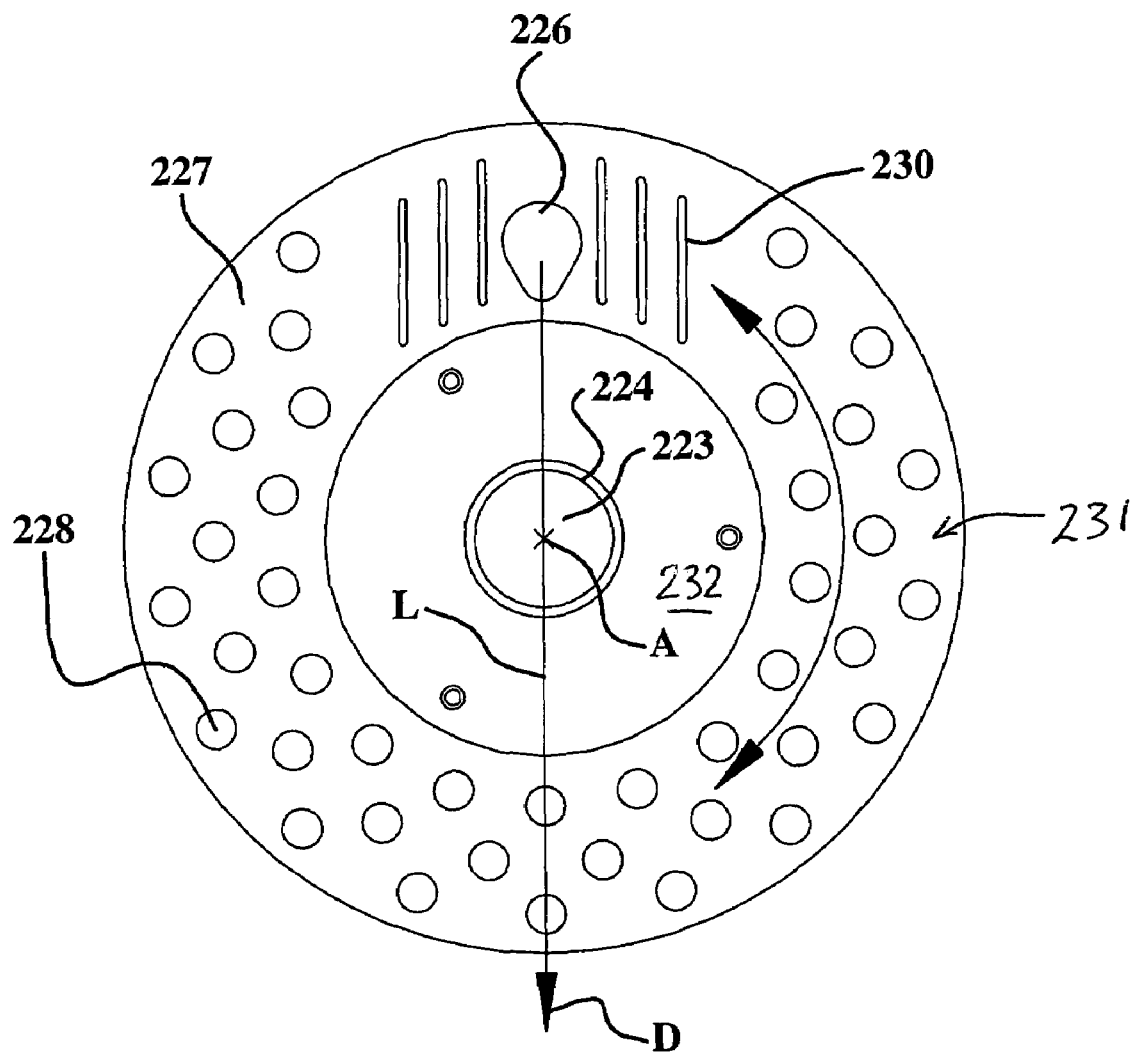
FIG. 10 is a bottom plan view of the embodiment of FIG. 9.

Turning now to FIGS. 9 and 10 there is shown a further embodiment which operates in the manner as previously described but in which the suction cleaning system is mounted wholly within the end plate of the router. In this arrangement the router is intended to be used as a hand held or movable router rather than an attachment to a table. In this embodiment, therefore, the router 18 includes a motor 19, a bit 21 carried on a drive shaft 20 and an end plate 22.

In this embodiment the end plate 22 includes a center piece 221 and an outer portion 222 which is free to rotate around the center portion 221. Thus the center portion 221 is fixed to the motor 18. The center portion 221 defines a bit opening 223 through which the drive shaft 20 extends to the bit 21. The bit opening 223 includes side walls 224 which separate the bit opening from the remainder of the end plate so that the suction to the end plate is communicated to an opening in the end plate and not to the bit opening as previously described. The end plate 22 has a bottom surface 231 for sliding over the workpiece which includes a bottom portion 232 of the center portion 221 and a bottom portion 227 of the outer portion 222. The outer portion 222 includes the suction duct 225 which has an opening 226 in the bottom surface 227 of the outer portion 222.

The router motor includes handles 191 which allow the user to hold the router for sliding movement of the bottom surface of the end plate over the work piece 13. The surface thus lies in a radial plane of the axis of rotation of the bit indicated at A and forms a generally flat surface allowing the user to press the surface against the work piece and thus hold the axis of the bit at right angles to the upper surface of the work piece.

To allow sliding movement of the surface 231 over the work piece, there is provided a plurality of circular protrusions 228 arranged in an array over the majority of the surface 227 of the outer portion 222 with each protrusion having a generally dome shape so as to provide a relatively small contact patch of the dome shaped protrusion on the surface of the work piece. Between the outer rotatable portion 222 and the inner portion 221 is provided a suitable bearing arrangement 229. Thus the outer portion can be rotated so that the opening 226 lies on a line L which is a radius to the axis A and lies along the direction of movement of the router over the work piece. The opening 226 is arranged to trail the bit 21 as the router is moved in its forward direction indicated by the arrow D. As the router turns and moves in a path chosen by the user the opening can be moved to remain on the line L so that the opening 226 intersects the line L and thus defines a passage along the workpiece indicated at P to carry the waste material from the cutting action along the cut piece formed by the bit to the opening 226 and the suction duct 225.

Guiding of the rotation to maintain the opening 226 on or intersecting with the line L can be achieved by a number of different methods. Firstly the rotation of the outer portion 222 can be controlled manually by the user. Secondly the rotation can be controlled by frictional engagement between elements on the surface 227 and the workpiece thus tending to pull the opening 226 to a position trailing the forward movement of the router and the bit. In the embodiment shown this is obtained by providing as some of the protrusions longitudinal protrusions 230 which are elongate in the direction of intended movement so that they have a tendency to slide over the surface in a direction longitudinal to the direction of movement. Thus each of the elongate protrusions 230 forms a protruding rib having an elongate contact patch projecting from the surface 227 and lying in contact with the upper surface of the workpiece. Thus any tendency of the elongate contact patch to rotate away from the line L causes additional forces tending to bring the elongate ribs back to a position parallel to the line L, thus holding the opening 226 approximately on the line L trailing the bit 21.

The arrangement described above operates as previously described in that the suction duct at the surface in contact with the work piece is located away from the bit opening and thus defines with the work piece a channel for passage of the waste material generated by the bit along the passage across the surface defined by the bottom face of the plate 22 and into the opening 226 through the bottom surface of the plate to the suction duct 225 connected to the suitable suction source.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method of machining a workpiece with a router bit comprising:
   providing a workpiece;
   providing a router having a router motor and a router bit rotated by the router motor;
   providing a plate defining a surface of the plate with the surface in contact with the workpiece;
   providing a bit hole through the plate with a bit opening at the surface through which the router bit extends for engaging the workpiece which is in contact with the surface so that the bit cuts a shape into the workpiece;
   causing relative translational movement between the workpiece and the router bit so as to effect a cutting action on the workpiece to form the shape therein by the router bit as the bit rotates so as to cause waste material to be generated by removal of material from the workpiece as the relative movement between the bit and the workpiece acts to form the shape along the workpiece;
   the surface of the plate being arranged such that the relative movement between the router bit and the workpiece also causes relative sliding movement between the surface of the plate and the workpiece while the surface remains in contact with the workpiece;
   providing a suction duct;
   providing at least a first suction opening at the surface of the plate;
   providing a suction hole extending from the first suction opening at the surface of the plate to the suction duct on a side of the plate opposite to the surface of the plate;
   providing the first suction opening at the surface at a location spaced from the bit opening of the surface so that the first suction opening is separated from the bit opening by a portion of the surface over which the workplace can slide while in contact with the portion of the surface;
   connecting the suction duct to a source of suction to draw air and the waste material through the first suction opening;
   and directing the relative translational movement between the workpiece and the router bit such that the workpiece moves relative to the surface from the bit toward the first suction opening over the portion of the surface thus causing the cut shape to extend from the bit to the first suction opening and causing the shape in the workpiece and the portion of the surface to co-operate to define a passage for the waste material from the bit to the first suction opening.

2. The method according to claim 1 wherein the plate forms at least part of a router table such that the surface forms an upper work surface of the router table, wherein the router is supported below the router table such that the router has the router bit driven by the router motor about a bit axis which is at right angles to the work surface, such that the router bit projects through the bit opening to a position above the work surface and such that the first suction opening extends from the work surface to an under side of the table.

3. The method according to claim 2 wherein the plate forms a portion only of the table which defines an insert into an opening in the table.

4. The method according to claim 2 wherein the first suction opening is located in an extension piece mounted at one edge of the work surface of the table.

5. The method according to claim 1 wherein there is provided a second suction opening located at the surface, the second suction opening being at a location spaced from the bit opening by a second portion of the surface and from the first suction opening by a third portion of the surface.

6. The method according to claim 5 wherein the second suction opening is arranged substantially on a line from the axis of bit which line is at right angles to a line joining the first suction opening and the axis of the bit.

7. The method according to claim 2 wherein the relative translational movement between the workpiece and the router bit is directed by a guide fence on the table.

8. The method according to claim 5 wherein the relative translational movement between the workpiece and the router bit is controlled such that the cut shape is moved from the first suction opening to the second suction opening.

9. The method according to claim 2 wherein the router motor has an end plate clamped to the under side of the plate, wherein the first suction opening is located in a position on the plate which is outside of the area of the end plate of the router motor and wherein there is provided a suction head connected to the plate for connection of said suction source to the first suction opening.

10. The method according to claim 2 wherein the router motor has an end plate clamped to the under side of the plate, wherein the first suction opening is located in a position on the plate which is inside of the area of the end plate of the router motor and wherein there is provided a duct formed in the end plate of the router motor which connects to the suction source and to the first suction opening.

11. The method according to claim 10 wherein the duct formed in the end plate of the router motor is separated from a bit opening in the end plate.

12. The method according to claim 10 wherein there is provided a second suction opening through the plate from the work surface to the under side of the table, the second suction opening being at a location spaced from the bit opening and from the first suction opening, the first and second suction openings being connected to the same duct formed in the end plate.

13. The method according to claim 1 wherein the plate forms an end plate of the router motor.

14. The method according to claim 13 wherein the end plate includes a portion thereof containing said first suction opening which can rotate around the bit axis relative to the router motor so as to move the angular location of the first suction opening around the bit axis relative to the router motor.

15. The method according to claim 14 wherein the portion of the end plate is annular and surrounds a fixed inner portion of the end plate.

16. The method according to claim 14 wherein the portion of the end plate includes raised guide members on the surface thereof for sliding of the portion relative to the workpiece.

17. The method according to claim 14 including guiding rotation of the portion of the end plate around the axis so as to locate the first suction opening on a line along the direction of movement of the router bit.

18. The method according to claim 17 wherein rotation of the portion of the end plate is guided by providing engagement members on the surface of the portion of the end plate arranged to cause rotation of the portion of the end plate by friction with the workpiece.

19. The method according to claim 17 wherein rotation of the portion of the end plate is guided by providing elongate guide ribs on the surface of the portion of the end plate arranged longitudinal of a line joining the first suction opening to the axis of the router bit.

20. A combination of a router and a router table member comprising
   a router having a router motor and a muter bit for rotation by the router motor;
   a router table member having an upper table surface over which a workpiece is to be moved and a bottom surface opposite to the upper table surface;
   the router being connected underneath the bottom surface such that the router has the router bit driven by the router motor about a bit axis which is at right angles to the upper table surface;
   the router table member having a router bit hole through the table member and defining a router bit opening in the upper table surface through which the router bit extends for engaging a workpiece in contact with the upper table surface so that the bit cuts a shape into the workpiece;
   a guide for guiding relative translational movement between the workplace and the router bit so as to effect a cutting action on the workpiece to form the shape therein by the router bit as the bit rotates so as to cause waste material to be generated by removal of material from the workpiece as the relative movement between the bit and the workpiece acts to form the shape along the workpiece;
   the upper table surface being arranged such that the relative movement between the router bit and the workpiece also causes relative sliding movement between the upper table surface and the workpiece while the upper table surface remains in contact with the workpiece;
   at least a first suction opening at the upper table surface of the table member;
   a suction hole extending from the upper table surface to the bottom surface of the table member;
   the first suction opening being located in the upper table surface at a location spaced from the bit opening so that the first suction opening is separated from the bit opening by a portion of the upper table surface over which the workpiece can slide while in contact with the upper table surface;
   and a suction duct for connection to the suction hole in the table member so as to draw air and waste material through the first suction opening in the upper table surface to the suction duct;
   the guide being arranged in a direction for directing the relative translational movement between the workpiece and the router bit such that the workpiece moves relative to the upper table surface from the bit toward the first suction opening over the portion of the upper table surface thus causing the cut shape to extend from the bit to the first suction opening and causing the shape in the workpiece and the portion of the upper table surface to co-operate to define a passage for the waste material from the bit to the first suction opening.

21. The combination according to claim 20 wherein the first suction opening is located in the upper table surface.

22. The combination according to claim 20 wherein the first suction opening is located in an extension piece mounted at one edge of the upper table surface.

23. The combination according to claim 20 wherein there is provided a second suction opening through the table member from the upper table surface, the second suction opening being at a location spaced from the bit opening by a second portion of the upper table surface and from the first suction opening by a third portion of the upper table surface.

24. The combination according to claim 20 wherein the router motor has an end plate clamped to the bottom surface of the table member, wherein the suction hole is located at a position on the table member which is outside of the area of the end plate of the router motor and wherein there is provided a suction head connected to the table member for connection of said suction duct to the suction hole.

25. The combination according to claim 20 wherein the router motor has an end plate clamped to the bottom surface of the table member, wherein the suction hole is located at a position on the table member which is inside of the area of the end plate of the router motor and wherein there is provided a duct formed in the end plate of the router motor which connects to the suction duct and to the suction hole.

26. A method of machining a workpiece on a router table with a router having a router motor and a router bit rotated by the router motor and including a source of suction, the method comprising:
   providing a plate for mounting in an opening in the table such that the plate defines an upper surface of the plate with the upper surface arranged for contact with the workpiece;
   attaching an end plate of the router motor to an under side of the plate such that the router bit extends through a bit hole through the plate with a bit opening at the upper surface through which the router bit extends for engaging the workpiece which is in contact with the upper surface so that the bit cuts a shape into the workpiece;
   causing relative translational movement between the workpiece and the router bit so as to effect a cutting action on the workpiece to form the shape therein by the router bit as the bit rotates so as to cause waste material to be generated by removal of material from the workpiece as the relative movement between the bit and the workpiece acts to form the shape along the workpiece;
   the upper surface of the plate being arranged such that the relative movement between the router bit and the workpiece also causes relative sliding movement between the upper surface of the plate and the workpiece while the upper surface remains in contact with the workpiece;
   providing at least a first suction opening at the upper surface of the plate;
   providing a suction hole extending from the first suction opening at the upper surface of the plate to the under side of the plate opposite to the surface;

providing the first suction opening at the upper surface at a location spaced from the bit opening in the upper surface so that the first suction opening is separated from the bit opening by a portion of the upper surface over which the workpiece can slide while in contact with the portion of the upper surface;

connecting the source of suction to the suction hole in the plate to draw air and the waste material through the first suction opening in the upper surface;

and directing the relative translational movement between the workpiece and the router bit such that the workpiece moves relative to the upper surface from the bit toward the first suction opening over the portion of the upper surface thus causing the cut shape to extend from the bit to the first suction opening and causing the shape in the workpiece and the portion of the upper surface to cooperate to define a passage for the waste material from the bit to the first suction opening.

27. The method according to claim 26 wherein there is provided a second suction opening located at the upper surface, the second suction opening being at a location spaced from the bit opening by a second portion of the upper surface and from the first suction opening by a third portion of the upper surface.

28. The method according to claim 27 wherein the second suction opening is arranged substantially on a line from the axis of bit which line is at right angles to a line joining the first suction opening and the axis of the bit.

29. The method according to claim 27 wherein the relative translational movement between the workpiece and the router bit is controlled such that the cut shape is moved from the first suction opening to the second suction opening.

30. The method according to claim 26 wherein the relative translational movement between the workpiece and the router bit is directed by a guide fence on the table.

31. A combination of a router and a router table comprising:

a router having a router motor and a router bit for rotation by the router motor;

a plate for mounting in an opening in the table such that the plate defines an upper surface of the plate with the upper surface arranged for contact with a workpiece;

an end plate of the router motor being attached to an under side of the plate such that the router bit extends through a bit hole through the plate with a bit opening at the upper surface of the plate through which the router bit extends for engaging a workpiece in contact with the upper surface so that the bit cuts a shape into the workpiece;

a guide for guiding relative translational movement between the workpiece and the router bit so as to effect a cutting action on the workpiece to form the shape therein by the router bit as the bit rotates so as to cause waste material to be generated by removal of material from the workplace as the relative movement between the bit and the workpiece acts to form the shape along the workpiece;

the upper surface of the plate being arranged such that the relative movement between the router bit and the workpiece also causes relative sliding movement between the upper surface of the plate and the workpiece while the upper surface remains in contact with the workpiece;

at least a first suction opening at the upper surface of the plate;

a suction hole extending from the first suction opening at the upper surface of the plate to the under side of the plate opposite to the surface;

the first suction opening being located in the upper surface at a location spaced from the bit opening in the upper surface so that the first suction opening is separated from the bit opening by a portion of the upper surface over which the workpiece can slide while in contact with the portion of the upper surface;

a source of suction connected to the suction hole in the plate to draw air and the waste material through the first suction opening in the upper surface;

the guide being arranged in a direction for directing the relative translational movement between the workpiece and the router bit such that the workpiece moves relative to the upper surface from the bit toward the first suction opening over the portion of the upper surface thus causing the cut shape to extend from the bit to the first suction opening and causing the shape in the workpiece and the portion of the upper surface to cooperate to define a passage for the waste material from the bit to the first suction opening.

32. The combination according to claim 31 wherein there is provided a second suction opening located at the upper surface of the plate, the second suction opening being at a location spaced from the bit opening by a second portion of the upper surface and from the first suction opening by a third portion of the upper surface.

33. The combination according to claim 31 wherein the second suction opening is arranged substantially on a line from the axis of bit which line is at right angles to a line joining the first suction opening and the axis of the bit.

34. A combination of a router and a router table comprising:

a router having a router motor and a router bit for rotation by the router motor;

a plate for mounting in an opening in the table such that the plate defines an upper surface of the plate with the upper surface arranged for contact with a workpiece;

an end plate of the router motor being attached to an under side of the plate such that the router bit extends through a bit hole through the plate with a bit opening at the upper surface of the plate through which the router bit extends for engaging a workpiece in contact with the upper surface so that the bit cuts a shape into the workpiece;

the upper surface of the plate being arranged to allow relative translational movement between the workpiece and the router bit so as to effect a cutting action on the workpiece to form the shape therein by the router bit as the bit rotates so as to cause waste material to be generated by removal of material from the workpiece as the relative movement between the bit and the workpiece acts to form the shape along the workpiece;

the upper surface of the plate being arranged such that the relative movement between the router bit and the workpiece also causes relative sliding movement between the upper surface of the plate and the workpiece while the upper surface remains in contact with the workpiece;

a first suction opening at the upper surface of the plate;

a first suction hole extending from the first suction opening at the upper surface of the plate to the under side of the plate opposite to the surface;

the first suction opening being located in the upper surface at a location spaced from the bit opening in the upper surface so that the first suction opening is separated from the bit opening by a first portion of the upper surface over which the workpiece can slide while in contact with the upper surface;

a source of suction connected to the first suction hole in the plate to draw air and the waste material through the first suction opening in the upper surface;

a second suction opening at the upper surface of the plate;

the second suction opening being at a location spaced from the bit opening by a second portion of the upper surface and from the first suction opening by a third portion of the upper surface, over which second and third portions the workpiece can slide while in contact with the upper surface;

the second suction opening being arranged substantially on a line from the axis of bit which line is at right angles to a line joining the first suction opening and the axis of the bit.

* * * * *